(No Model.) 2 Sheets—Sheet 1.
O. FRIEDRICH & W. SCHULTE.
APPARATUS FOR DRAWING RIBBED TUBES.
No. 545,067. Patented Aug. 27, 1895.
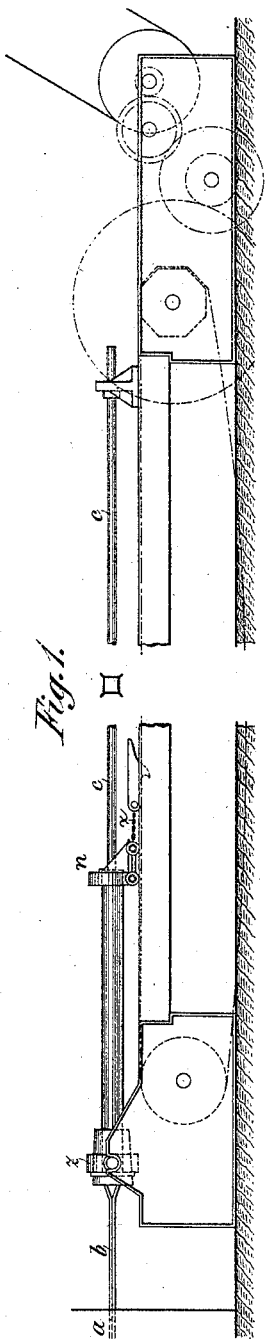
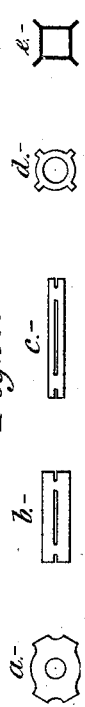
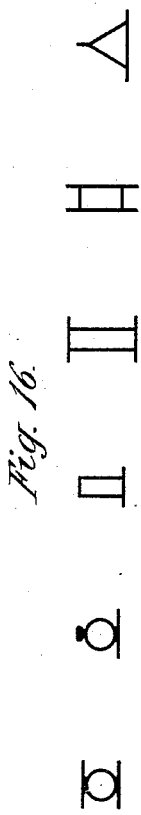
WITNESSES:
Fred White
Thomas F. Wallace
INVENTORS:
Oscar Friedrich and Wilhelm Schulte,
By their Attorneys:
Arthur C. Fraser & Co.

(No Model.) 2 Sheets—Sheet 2.
O. FRIEDRICH & W. SCHULTE.
APPARATUS FOR DRAWING RIBBED TUBES.
No. 545,067. Patented Aug. 27, 1895.
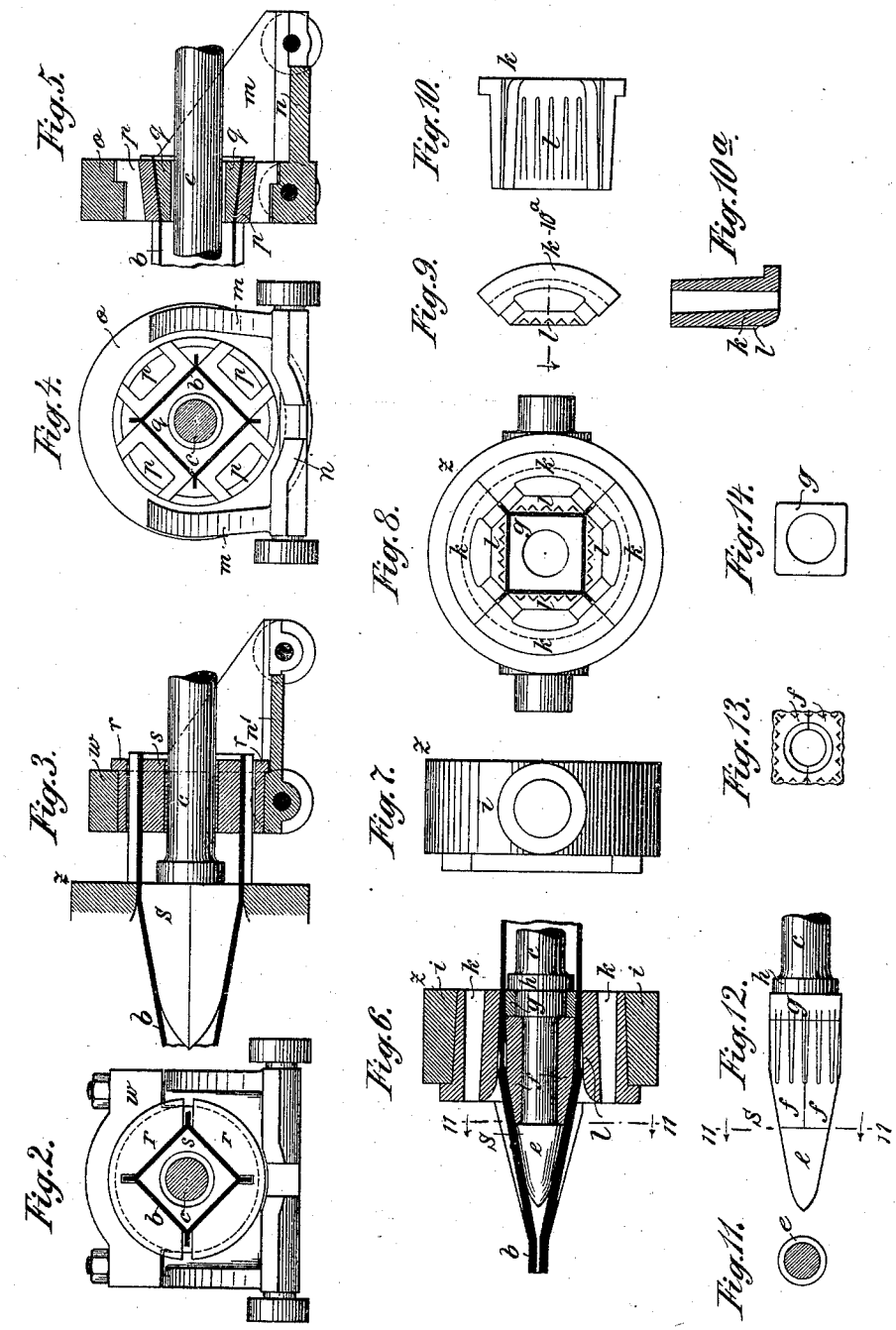
WITNESSES:
Fred White
Thomas F. Wallace
INVENTORS:
Oscar Friedrich and Wilhelm Schulte,
By their Attorneys,
Arthur C. Fraser & Co.

UNITED STATES PATENT OFFICE.

OSCAR FRIEDRICH AND WILHELM SCHULTE, OF DUISBURG, GERMANY, ASSIGNORS TO DUISBURGER EISEN- UND STAHLWERKE, OF SAME PLACE.

APPARATUS FOR DRAWING RIBBED TUBES.

SPECIFICATION forming part of Letters Patent No. 545,067, dated August 27, 1895.

Application filed March 7, 1895. Serial No. 540,806. (No model.) Patented in Germany January 31, 1894, No. 79,607.

*To all whom it may concern:*

Be it known that we, OSCAR FRIEDRICH and WILHELM SCHULTE, subjects of the German Emperor, and residents of Duisburg, Kingdom of Prussia, Germany, have invented certain new and useful Improvements in Apparatus for Drawing Ribbed Tubes, (which invention is the subject of Letters Patent in Germany, No. 79,607, dated January 31, 1894,) of which the following is a specification.

This invention relates to processes and apparatus for making seamless metal tubes and hollow or tubular bodies with ribs or flanges on the draw-bench, and provides improved apparatus therefor. These ribs or flanges are longitudinal ones to strengthen tubes used as bearers and pillars.

It is known that bearers and pillars produced by rolling have serious defects. More especially the greater T and I shaped profiles are not sufficiently strong or stiff to avoid distortion. Such bearers or pillars will easily warp, as they are comparatively of little substance of material, and therefore not sufficiently strong in proportion to their weight. For this reason box-formed bearers of various kinds with or without ribs or flanges for use in connection with bridge and other structural purposes have been hitherto manufactured from pieces of sheet, angle, and other shaped iron riveted together, thereby obtaining a stronger and more rigid column or bearer than those produced by rolling. Such riveted bearers and pillars are expensive to manufacture and too heavy in proportion to their strength, as the thickness of the sections has to be greatly increased to make good the loss of strength caused by the rivet-holes. Further, the great number of rivets used in the construction of such columns or bearers frequently involves difficult and costly repairs, and, as is well known, they are more difficult to paint and more liable to deterioration. Repeated attempts have been made to manufacture such bearers and pillars by rolling, but the rolling even of simple hollow or tubular bodies over a mandrel, as well as the shaping of hollow bodies filled with sand, has been a difficult operation. Although much wanted, especially in building construction, such seamless box-shaped bearers and pillars, stiffened by longitudinal ribs or flanges and made from malleable material of uniform substance throughout, have not yet been manufactured with facility. The methods in use for rolling are scarcely suitable for making plain tubes of somewhat larger diameters. Contrary to rolling, the manufacture of such box or hollow bearers or columns with longitudinal ribs or flanges has been successfully carried out by us on our improved draw-bench, as hereinafter described. Seamless supporting beams and pillars so manufactured on the draw-bench are an entirely new and useful article for use in connection with building, machine, and other construction, the manufacture of which has been hitherto unsuccessfully attempted.

The great disadvantages of pillars, beams, &c., composed of sheet, angle, and other shaped iron riveted together, and of those produced by rolling, are entirely obviated in those manufactured by the improved apparatus of our invention. By a particular formation and solidification of the nearly-finished article in our improved draw-bench, wrought-iron, as well as steel, obtains a density never before reached. The walls of longitudinally-flanged or ribbed tubes can be drawn very thin, because their resistance against distortion is secured by their box or trunk shape in such a high degree that the thickness of the walls which would be necessary for riveting can be greatly decreased. Further, these seamless tubular pillars and bearers can be better protected against rust by paint than those made by riveting, which latter easily rust on the rivet-heads and therefore often require repainting and repairs, while the improved drawn pillars and bearers, made without seam, in addition to being very light and having great supporting capacity, require only small expense of maintenance.

The method of manufacturing the improved tubes and other articles with our improved apparatus is as follows: Hollow bodies of malleable material, cast or otherwise produced, and having pieces connected therewith for producing the flanges or ribs, after having been pressed and stretched into flat bands in a rolling-mill or under the steam-hammer, are opened out at one end by hand and by suitable devices in such manner that the band-formed piece can be drawn on a suitable strong draw-bench over our improved specially-constructed fixed mandrel, which at its rear end has the form of the inner profile and works in conjunction with our improved specially-formed draw-plate, which has in its back cross-section the outer profile of the bearer or pillar.

The invention is illustrated in the accompanying drawings, in which—

Figure 1 represents diagrammatically and fragmentarily an arrangement of draw-bench suitable for this purpose. Fig. 2 is a rear elevation of the carriage; and Fig. 3 is a longitudinal section thereof and of part of the draw-plate, showing one method of fixing the end of the article being worked to a traveling carriage. Fig. 3 also shows in elevation a simple form of opener and expander forming the head of the mandrel. Figs. 4 and 5 are similar views to Figs. 2 and 3, showing the preferred arrangement for holding the end of the article being worked. Fig. 6 is a longitudinal section showing the preferred form of draw-plate and the preferred form of opener and expander or head of mandrel. Figs. 7 and 8 are respectively a side and front elevation of the draw-plate and frame shown at Fig. 6. Figs. 9, 10, and 10$^a$ are respectively an end view, a face view, and a section on the line 10$^a$, Fig. 9, of one of the draw-plate sections shown at Figs. 6, 7, and 8. Fig. 11 is a cross-section on the line 11 11. Fig. 12 is a side view, and Figs. 13 and 14 are opposite end views of the preferred form of mandrel-head shown at Fig. 6. Fig. 15 represents various stages of the process undergone by the article before it is finished, and Fig. 16 represents other forms of articles capable of being produced by our invention.

Fig. 1 shows in what manner the previously opened-up band $b$, coming from the heating-furnace $a$, is brought to the bench and drawn to the required shape. The mandrel consists of a rod or shaft $c$ and a long-extended head S. This mandrel-head is formed at its fore part as an opening-wedge, while the rear end has a parallel exterior, as shown at Figs. 2, 3, 6, 8, 11, 12, 13, and 14. This wedge-shaped fore part, when required to produce articles of considerable size, consists of the pointed wedge or opener $e$ and the stretcher or expander $f$, Figs. 6, 7, 11, 12, 13, and 14. The draw-plate $z$, for such forms of columns or bearers as can be produced by a single drawing, is constructed as a long-extended funnel. In the interior of this funnel, and parallel with the axis of the piece to be drawn, are raised round-shaped ribs, which are gradually widened out and flattened from front to rear, and finally run into a plane surface corresponding with the walls of the finished bearer or column. These ribs, the cross-section of which is continually altering along the longitudinal axis of the draw-plate, are arranged in such a manner that the material of the walls of the piece being drawn, which has been opened and widened to some extent by the wedge-point $e$ and the expander $f$, is at first only slightly grooved by the forward part of the ribs on the mandrel-head, and then pressed sidewise and distributed by the following broadened parts of such ribs in such manner that the band-shaped piece being worked will during its drawing over the mandrel and through the draw-plate only gradually assume a form similar to the rearmost cross-section of the draw-plate and mandrel-head. Thus, in the rear part of the draw-plate and of the mandrel-head no further shaping of the tube takes place, but only a compression and finishing or smoothing of the already shaped work, similar to the ordinary drawing process.

In many cases it is preferable to construct the draw-plate of several sections $k$, as shown in Figs. 6 to 10$^a$. The sections $k$ are mounted in a strong frame $i$, having trunnions $i'$ mounted in bearings in the draw-bench, and such parts $k$ and $i$ are formed with corresponding conical friction surfaces, and the sections are immovably held in their right position by any suitable means. These draw-plate sections are provided at their front part with blunt wedge-shaped ribs $l$, which produce and gradually spread furrows in the material of the piece being drawn and finally smooth them down on the anvil $g$, in order to press and distribute the material sidewise in every direction. The rear end of these draw-plate sections represents an ordinary draw-plate for compressing and smoothing the finished walls of the article. Each section of the draw-plate is preferably arranged so as to form free spaces between the sections in a longitudinal direction, in order to receive part of the sidewardly-pressed material, which is there formed into a flange or rib, as shown at Fig. 8. The opening out of the flattened tube may be effected by several mandrels and in several operations, and this may also apply to the furrowing and distribution of the material on the outside of the piece being drawn. This would allow of making the draw-plates or the sections lighter and shorter and thereby easier to handle, while at the same time the frame $i$, as also the front end of the piece to be opened up, can be kept shorter. With the last drawing operation the shaping, the compression, and the smoothing or polishing of the walls of the bearers or columns is finished. The same mandrel rod or shaft $c$ may be used with different stretchers or expanders $f$ and anvils $g$, these parts being separately made in special shapes. The anvil $g$ (see Figs. 6, 12, and 14) is slipped over the opener $c$ and pressed against the collar $h$, after which all the sections of the stretcher or expander $f$ are laid round the neck between the anvil $g$ and the point or opener $e$.

In Figs. 4 and 5 a device is represented for fixing the piece to be drawn on the draw-bench. This device consists of a frame $o$, rigidly connected with the carriage-plate $n$ by brackets $m$, and into which clamping-pieces $p$ are inserted. These clamping-pieces, in conjunction with the conical or tapering inner ring $q$, form a space between them which corresponds in cross-section to the shape of the piece being drawn, and are sufficient to grip and hold the latter firmly without the use of any screw, key, or wedge when the carriage is moved along the bench. When the article formed is to be used as a column or pillar, the expanded conical end, by which it is attached to the draw-bench, will form a solid base. The draw-chain $x$ is attached to the rear axis of the carriage $n$.

Figs. 2 and 3 show another device for gripping the piece to be drawn. In this case the carriage $n'$ is provided with a pedestal or bearing-chair $w$, into which a divided ring $r$ is inserted, the latter, by means of screws or a suitable locking-lever, gripping and holding the article firmly on the outer side, while a loosely-fitting ring $s$, on the mandrel rod or shaft $c$, prevents the crushing or deformation of the article being manufactured.

We claim as our invention the following-defined novel features, substantially as hereinbefore specified, namely:

1. In a machine for making seamless box-shaped beams, bearers and columns by the process herein described, the combination of a draw-bench having a fixed mandrel, a fixed draw plate, and a traveling carriage, to which latter one end of the work is fixed, such mandrel head being pointed at its front end so as to open the flattened hollow body, and both mandrel-head and draw plate having initial spreading provisions and succeeding compressing surfaces reciprocally located and acting on the work to bring the material to the desired shape by first distributing it sidewise and then finally compressing and smoothing the same, substantially as herein set forth.

2. In a machine for the manufacture of seamless box-shaped beams, bearers and columns by the process herein described, the combination of a draw bench having a draw plate consisting of a solid outer frame provided with trunnions mounted in bearings in the draw bench and having a conical aperture, of draw plate sections fitting such conical aperture, and having spaces between the sections to form longitudinal strengthening flanges or ribs on the work passing between them, such aperture having its part of larger diameter opposed to the entering work, whereby the work in its travel holds said sections in position, substantially as herein set forth.

3. In a draw-bench employed in conducting the process herein described, the combination of a draw plate constructed as herein described, with a mandrel head consisting of a fixed opening point, a fixed collar at the rear of such fixed point, a loose circular anvil passed over the point and fitting against such collar, and loose expander sections fitting around the neck of the head between the point and the anvil, whereby the form of the mandrel head can be varied, substantially as set forth.

4. In a draw-bench employed in conducting the process herein described, the peculiar construction of mandrel head and draw plate, each being formed with curved ribs parallel with the axis of the work, and with plain finishing surfaces, the said ribs being gradually widened and flattened from front to rear where they die off into the plain finishing surfaces, substantially as herein set forth and for the purpose stated.

5. In a machine for drawing metal tubes, a draw plate, and a traveling carriage to which the work is fixed, in combination with a mandrel head over which the work is drawn to open, spread and shape it, said head having spreading provisions acting on the interior of the work and thinning and spreading it, and said head having beyond said spreading provisions a smooth surface acting on the interior of the work and smoothing and shaping it, substantially as and for the purpose set forth.

6. In machines for drawing metal tubes, a traveling carriage to which the work is fixed, and a draw plate having a die through which the work is drawn, said die having walls, having initial spreading surfaces acting on the work and thinning and spreading it, and having smooth surfaces succeeding said provisions acting subsequently on the work and compressing and shaping it as it is drawn through the die.

7. In machines for making hollow beams with longitudinal outer ribs, a mandrel head passing within the beam, and means for drawing the beam over the head, in combination with a draw plate having a die aperture surrounding said head and having walls, of the shape to be given to the outside of the work between the ribs of the latter, compressing the work against said head between the ribs and thereby shaping it, and having recesses between said walls coinciding with the longitudinal flanges of the work, receiving and passing these flanges during the drawing.

8. In machines for making metal tubes, means for grasping and moving the work, in combination with a mandrel head and a draw plate, relatively fixed and having reciprocal faces opposed to each other in the same cross sectional plane, the faces on the mandrel tapering outwardly and acting against the inner side of the work, and the faces on the draw plate tapering inwardly and acting against the outer side of the work, substantially as and for the purpose set forth.

In witness whereof we have hereunto signed our names in the presence of two subscribing witnesses.

OSCAR FRIEDRICH.
WILHELM SCHULTE.

Witnesses:
ERNESTINE BORDRE,
WILLIAM ESSENWEIN.